2,827,755
Patented Mar. 25, 1958

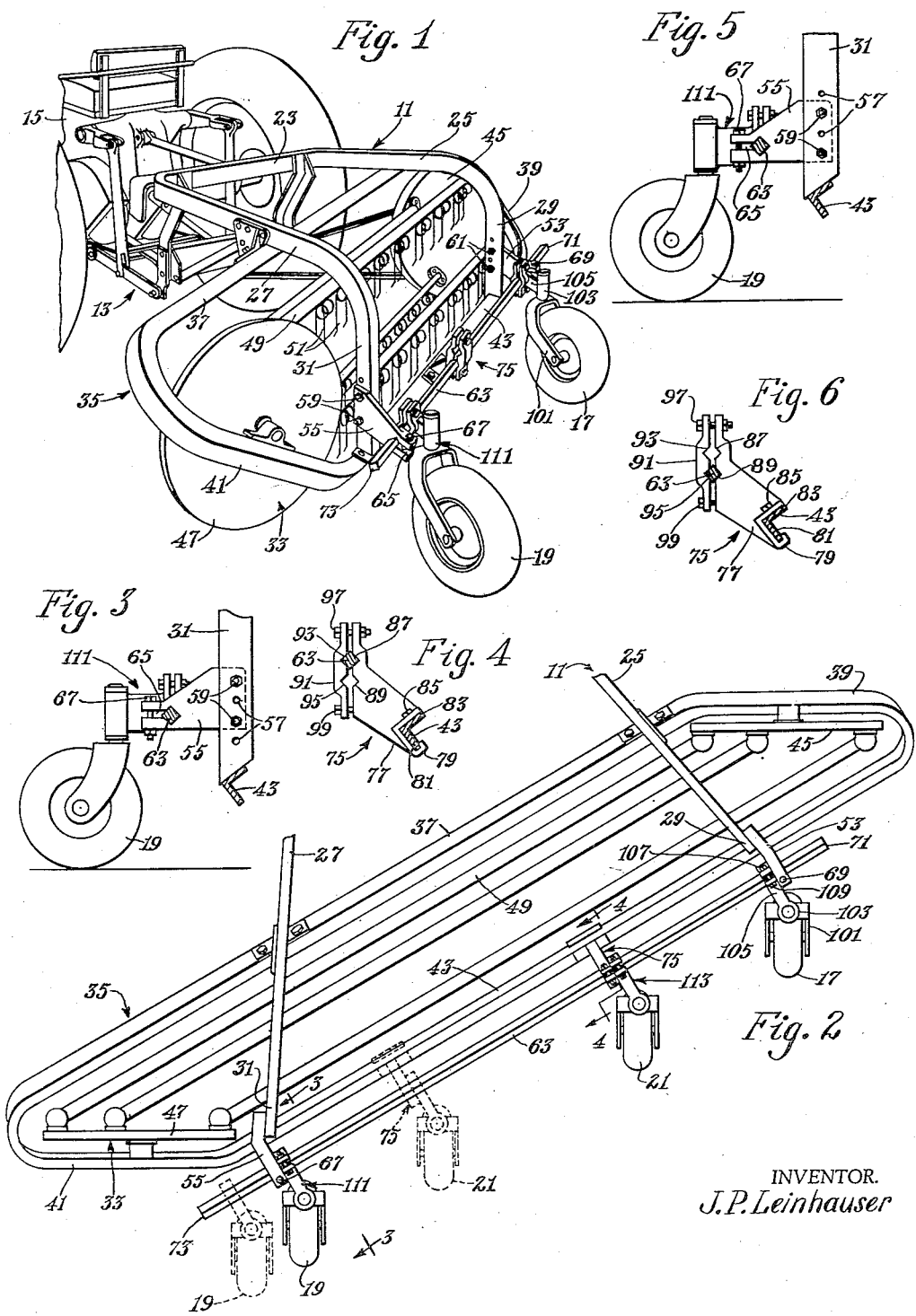

United States Patent Office

2,827,755
WHEEL MOUNTING FOR SIDE DELIVERY RAKE

Joe P. Leinhauser, Ottumwa, Iowa, assignor to Deere Manufacturing Co., Dubuque, Iowa, a corporation of Iowa Application April 29, 1957, Serial No. 655,556

16 Claims. (Cl. 56—377)

This invention relates to a side-delivery rake and more particularly to an improved wheel mounting for supporting the rear end thereof.

In a typical side-delivery rake, whether tractor-mounted or simply tractor-drawn, the front end is adequately supported, in the first case directly on the tractor and in the second case on front ground wheels, in addition to which the rear end of the rake is supported on one or more caster wheels. Heretofore, the conventional rake, when including more than one caster wheel, spaced these wheels laterally apart on the basis of an average setting based on normal expectancies in operation. However, the uses to which a side rake are put, and particularly relative to the types of terrain over which they are operated, present new problems not encountered heretofore. One of these situations involves operation of the rake over irrigated land where the field is corrugated by a plurality of small ditches, normally on the order of four to six inches wide and three to four inches deep, being usually spaced anywhere from twenty to sixty inches apart. In the operation of a side-delivery rake over a field of this type, it often occurs that both caster wheels (if two are used) will simultaneously drop into corrugations, which results in forcing the rake teeth into the ground with the entire weight of the rake on the teeth, especially in rakes in which the reel is not independently suspended. Even if only one caster wheel drops into a corrugation or ditch, the jamming of the rake teeth at one end is undesirable. The foregoing results occur whether the rake is operated transverse to, parallel to or diagonally of the ditches. One solution to the problem has been the addition to the rake of a third caster wheel, which wheel is mounted relatively close to the left hand caster wheel.

In other types of operations, particularly in the harvesting of peanuts, it is desirable to handle only two rows at a time with the side-delivery rake and to move these two rows a limited distance. This is achieved in one instance by removing some of the teeth from the right hand end of the rake reel, thus giving a shorter effective raking width. However, the normally positioned right hand caster wheel would then roll over the row that is not being raked. This problem can be solved by moving the right hand caster wheel to the left. However, the ordinary side-delivery rake does not have provision for either adding extra wheels or relocating the wheels initially provided, and the solutions to the problem referred to above have been achieved mainly on the basis of providing "conversion bundles" for field modification of the rakes.

According to the present invention, the conventional rake is modified by the provision of a rear support in the form of an elongated bar disposed transverse to the line of advance and on which bar any number of caster wheels may be mounted for selective lateral positioning. It is an important object to provide this mounting bar as an attachment for existing rakes, whereby such rakes may be converted, retaining however the feature of initially producing rakes with the bar thereon. A still further object of the invention is to provide means for vertically adjusting the bar so that the level of the main frame and consequently of the reel can be varied, thereby varying the pitch angle of the teeth relative to the ground.

The foregoing and other important objects and desirable features inherent in and encompassed by the invention will become apparent as a preferred embodiment thereof is disclosed in detail in the ensuing specification and accompanying sheet of drawings, the several figures of which are described immediately below.

Fig. 1 is a fragmentary perspective showing a rake connected to a tractor as seen from the rear.

Fig. 2 is a fragmentary plan, on an enlarged scale, of a rake as shown in Fig. 1 but equipped with three caster wheels, illustrating additional caster wheels or relocated caster wheels in broken lines.

Fig. 3 is an enlarged section as seen along the line 3—3 of Fig. 2.

Fig. 4 is an enlarged section as seen along the line 4—4 of Fig. 2.

Fig. 5 is a view like Fig. 3 but showing a change in position between the main frame and the caster wheel support.

Fig. 6 corresponds to Fig. 4 but accommodates the changed position as shown in Fig. 5.

The rake illustrated here is of the so-called integral type, comprising a mobile main frame 11 connected by a typical three-point hitch 13 to the rear of a conventional tractor 15 and supported at its rear end by ground-engaging means, here shown as a pair of caster wheels 17 and 19 in Fig. 1 and the two caster wheels 17 and 19 and a third caster wheel 21 in Fig. 2. As thus constituted, the main frame 11 extends generally fore-and-aft, its front portion being supported on the tractor by the hitch 13 and its rear end portion supported by the caster wheels. The main frame itself is of U-shape as viewed from above, having a transverse front portion 23 and right and left hand fore-and-aft side members 25 and 27 respectively terminating in depending rear end portions 29 and 31.

Rake mechanism 33, which may be of any conventional construction, is supported on the main frame 11, being disposed diagonally to the line of advance and being arranged in suspended relation from the main frame by means of a reel or basket frame 35 which has a transverse front frame member 37, opposite end members 39 and 41 and a rear cross member 43.

The rake mechanism comprises a pair of rotatable end spiders 45 and 47 cross-connected by rake bars 49 equipped with rake teeth 51. As will be recognizable by those versed in the art, the reel mechanism rotates in a conventional manner to advance crops forwardly and to the left as the tractor-rake unit advances over the field.

The foregoing is based largely on the conventional characteristics of a side-delivery rake. Such conventional rake is here modified by the provision of improved means for mounting one or more caster wheels and for accommodating selective lateral adjustment of such caster wheels. This means comprises right and left hand brackets 53 and 55 vertically adjustably secured respectively to the depending rear frame portions 29 and 31. Fig. 3 shows a typical connection of the bracket 55 to the depending frame end portion 31 as including a plurality of apertures 57 which may selectively receive a pair of bolts 59 whereby the vertical elevation of the main frame 11 may be changed. Fig. 3 shows a relatively low position and Fig. 5 shows a relatively high position. A similar means of adjusting the right hand bracket 53 is suggested by the presence of bolts 61 in Fig. 1. Since the two brackets and the mounting thereof are identical, or at least symmetrical, the details need not be repeated.

The bracket means 53 and 55 are of course spaced apart on the order of the transverse spacing between the end portions 29 and 31 and are thus adapted to carry an elongated bar of non-circular section, here preferably square, as identified by the numeral 63. As best shown in Figs. 3 and 5, the bracket 55 is split and notched at 65 and includes a clamping bolt 67 for securing the bar 63. A similar construction exists in the bracket 53, as evidenced by the presence of a clamping bolt at 69. When the bolts 67 and 69 are loosened, the bar 63 may be adjusted endwise to vary the length of the extension of its opposite ends, as at 71 and 73. As shown in Fig. 2, the caster wheel 19 may be relocated in a position in which it is mounted on the bar extension 73. Other variations will suggest themselves.

The bar 63 is carried intermediate its ends by an intermediate support 75, the details of which are shown in Figs. 4 and 6. In those figures, it is shown that the support 75 comprises a member 77 having lip means 79 for hooking under one flange 81 of the cross member 43, which cross member is of L-shaped cross section, having an angularly related flange 83 which is engaged by releasable means comprising a set screw 85 in the member 77. The set screw 85 may be loosened so that the member 77 may be slid lengthwise of the cross member 43. The member 77 further has upper and lower notches 87 and 89 and a cooperative cap 91 has upper and lower notches 93 and 95 to afford an adjustable releasable clamp connection between the bar 63 and the intermediate support 75. The cooperating notches 87—93 and 89—95 provide upper and lower bar-receiving portions on the support 75, and the releasable clamp connection is further augmented by upper and lower bolts 97 and 99 which releasably secure the cap 91 to the member 77. When the mounting brackets 53 and 55 are in the position shown in Fig. 3, the bar 63 is received in the upper notch means 87—93 of the support 75 as shown in Fig. 4. When the bracket position is changed relative to the main frame 11, as in Fig. 5, the bar 63 is received in the lower bar-receiving notch means 87—95. Since the cap 91 is readily removable from the member 77 via the bolts 97 and 99, the change between the two positions may be readily accomplished. When one or the other of the positions is retained, the bolts 97 and 99 may be merely loosened which, together with loosening of the set screw 85, enables the entire support to be slid lengthwise of the cross member 43 and bar 63, the cross member and bar being of course generally parallel.

The caster wheel 17 includes a wheel-mounting yoke 101 which is journaled in an upright bearing 103 that has a forwardly projecting bar-receiving portion 105 complemented by a cap 107. The cap is releasably secured to the portion 105 by bolts 109, which may be loosened so that the caster wheel mounting means thus described may be adjusted lengthwise of the bar 63. The cap is of course removable so that the position of the caster wheel may be changed to the outer end extension 71 of the bar 63 if desired. The mounting means for the caster wheels 19 and 21 are identical to that just described and therefore are not elaborated, but are simply designated as mounting means 111 for the caster wheel 19 and mounting means 113 for the caster wheel 21.

The vertical adjustability of the entire assembly relative to the main frame 11 has already been described, and the purpose of this adjustment is to change the elevation of the main frame and therefore to change the tooth pitch angle relative to the ground. As has been described, the intermediate support 75 has upper and lower means engaging means at 87—93 and 89—95, which means may also be considered releasable and tightenable clamp portions. The provision for lateral adjustability of the ground-engaging supports or caster wheels enables the use of as many caster wheels as are required, plus the provision for lateral adjustability of the caster wheels to obtain the best locations with respect to the type of terrain being operated on or the type of crops being handled. As will be clear from the peanut harvesting operation referred to above, the right hand caster wheel may be removed or it may be moved laterally inwardly so as to avoid running over the row of unraked peanuts. Selective variation among the positions of the caster wheels can be achieved to accommodate irrigation ditches and the like.

Features not categorically enumerated will undoubtedly occur to those versed in the art, as will many modifications and alterations in the preferred embodiment disclosed, all of which may be achieved without departing from the spirit and scope of the invention.

What is claimed is:

1. A side-delivery rake, comprising: a mobile main frame having a pair of laterally spaced apart fore-and-aft frame members respectively including rear end portions spaced above the ground; rake mechanism carried by said frame ahead of said rear end portions; a pair of bracket means, one on each rear end portion, and spaced laterally apart on the order of the lateral spacing of said rear end portions; an elongated bar extending horizontally between and carried by the brackets; a caster wheel; and means mounting the caster wheel on the bar for selective positioning lengthwise of said bar.

2. The invention defined in claim 1, in which: the bar has an extension at one end projecting laterally beyond the proximate bracket means; and the mounting means is detachable for selective mounting optionally on said extension or on the bar intermediate the bracket means.

3. The invention defined in claim 1, in which: each bracket means is vertically adjustable relative to its frame member rear end portion to change the level of the frame relative to the bar.

4. The invention defined in claim 1, including: a cross member generally paralleling the bar and extending between and carried by the frame member rear end portions; and a support carried by the cross member laterally between the bracket means and connected to the bar.

5. The invention defined in claim 4, in which: each bracket means is vertically adjustable relative to its frame member rear end portion to change the level of the frame relative to the bar, and the support is vertically adjustable relative to the bar to accommodate the change in level of the frame.

6. The invention defined in claim 5, in which: the support has a releasable clamp connection engaging the bar and said clamp connection has upper and lower bar-engaging means for selective engaging the bar at either of two levels.

7. The invention defined in claim 6, in which: the support is adjustable lengthwise of both the bar and the cross member.

8. A side-delivery rake, comprising: a mobile main frame having a pair of laterally spaced apart fore-and-aft frame members respectively including rear end portions spaced above the ground; rake mechanism carried by said frame ahead of said rear end portions; a pair of bracket means, one on each rear end portion, and spaced laterally apart on the order of the lateral spacing of said rear end portions; an elongated bar extending horizontally between and carried by the brackets; a plurality of caster wheels; and a plurality of means respectively mounting the caster wheels on the bar for selective and individual positioning lengthwise of said bar.

9. The invention defined in claim 8, in which: the bar has an extension at one end projecting laterally beyond the proximate bracket means; and one of the mounting means is detachable for selective mounting of its caster wheel optionally on said extension or on the bar intermediate the bracket means.

10. A side-delivery rake, comprising: a mobile main frame having a pair of laterally spaced apart fore-and-aft frame members respectively including rear end portions spaced above the ground; rake mechanism carried by said frame ahead of said rear end portions; an elongated cross member extending generally horizontally between and carried by said rear end portions behind the rake mechanism; a pair of bracket means, one on each rear end portion, and projecting rearwardly of the cross member and spaced laterally apart on the order of the lateral spacing of said rear end portions; an elongated bar generally paralleling the cross member and extending horizontally between and carried by the brackets; a support carried by the cross member and adjustable lengthwise thereof, said support projecting rearwardly and having releasable bar-engaging means for engaging the bar intermediate the bracket means; a caster wheel; and means mounting the caster wheel on the bar for selective positioning lengthwise of said bar.

11. The invention defined in claim 10, in which: the cross member is L-shaped in section and has angularly-related flanges; the support has lip means engaging one flange and releasable means engaging the other flange to constitute provision whereby the support is adjustable lengthwise of said cross member; and the releasable bar-engaging means on the support comprises releasable and tightenable bar-clamping portions.

12. The invention defined in claim 11, in which: each bracket means is vertically adjustable relative to its frame member rear end portion to change the level of the frame relative to the bar; and the bar-engaging means of the support includes additional releasable and tightenable clamp portions for receiving the bar when the level of the frame is changed relative to the bar.

13. In a side-delivery rake having a mobile main frame including rake mechanism and a frame portion rearwardly of said mechanism, the improvement comprising: an elongated bar carried by said frame portion rearwardly of and generally parallel to the rake mechanism; a ground-engaging support; and means mounting the ground-engaging support on and for selective positioning lengthwise of the bar.

14. In a side-delivery rake having a mobile main frame including rake mechanism and a frame portion rearwardly of said mechanism, the improvement comprising: an elongated bar carried by said frame portion rearwardly of and generally parallel to the rake mechanism; a plurality of ground-engaging supports; and means mounting the ground-engaging supports on and for selective and individual positioning lengthwise of the bar.

15. In a side-delivery rake having a mobile main frame including rake mechanism and a frame portion rearwardly of said mechanism, the improvement comprising: an elongated bar carried by said frame portion rearwardly of and generally parallel to the rake mechanism; a caster wheel; and means mounting the caster wheel on and for selective positioning lengthwise of the bar.

16. In a side-delivery rake having a mobile main frame including rake mechanism and a frame portion rearwardly of said mechanism, the improvement comprising: an elongated bar carried by said frame portion rearwardly of and generally parallel to the rake mechanism; a plurality of caster wheels; and means mounting the caster wheels on and for selective and individual positioning lengthwise of the bar.

No references cited.